United States Patent [19]

Andy

[11] 4,328,146

[45] May 4, 1982

[54] METHOD FOR IMPROVING CHARACTERISTICS OF POLYMETHYLPENTENE THROUGH ADDITION OF COATED MICA PARTICLES

[76] Inventor: Robert Andy, 60 Park Ter., Washington, Pa. 15301

[21] Appl. No.: 78,221

[22] Filed: Sep. 24, 1979

[51] Int. Cl.$^3$ .................... B32B 19/02; C08K 9/04
[52] U.S. Cl. ................... 523/216; 106/291; 106/308 F; 428/363; 524/449; 524/472; 524/579
[58] Field of Search ............ 260/42.14, 42.45, 28.5 A; 106/291, 308 F; 428/363

[56] References Cited

U.S. PATENT DOCUMENTS

| | | | |
|---|---|---|---|
| 2,954,552 | 9/1960 | Halpern | 106/290 |
| 3,655,565 | 4/1972 | McDonald | 428/363 |
| 3,951,680 | 4/1976 | Robertson | 106/291 |
| 4,066,604 | 1/1978 | Wong | 106/291 |
| 4,173,492 | 1/1979 | Pollard | 106/308 F |

FOREIGN PATENT DOCUMENTS 772592 11/1967 Canada ............................... 428/363

OTHER PUBLICATIONS

Chem. Abstracts 94 209,498, Abstract of Japanese Pat. No. 81-30412.

*Primary Examiner*—James C. Cannon
*Attorney, Agent, or Firm*—William J. Ruano

[57] ABSTRACT

A method for reducing heat distortion but retaining high dielectric properties and volume resistivity of polymethylpentene. The method comprises dry blending chlorinated paraffin wax on mica particles and mixing so as to coat the mica particles and thereafter mixing with polymethylpentene in a blender so as not to break the mica particles or strip the wax coating therefrom. The resulting compound is then fed into an extruder at temperatures of about 325° F. to 475° F. The resulting material is then pelletized or strand cut.

2 Claims, No Drawings

METHOD FOR IMPROVING CHARACTERISTICS OF POLYMETHYLPENTENE THROUGH ADDITION OF COATED MICA PARTICLES

This invention relates to a method for improving the characteristics of polymethylpentene, such as by reduction of heat distrotion.

Polymethylpentene is useful in microwave ovens because of its high dielectric properties and volume resistivity which are not affected by microwaves. However, one disadvantage of polymethylpentene is that it has objectionable heat distortion as a consequence of continued application of microwaves.

An object of the present invention is to overcome the aforesaid disadvantage.

A more specific object of the invention is to mix polymethylpentene with a material that allows retention of the good electrical properties of polymethylpentene while improving its resistance to heat distortion.

Other objects and advantages of the present invention will become more apparent from the following description.

In accordance with the present invention, mica particles are coated with chlorinated paraffin wax by thoroughly mixing the mica particles in a dry blender, there being about 2% by volume of the chlorinated paraffin wax. As a consequence of such blender, the wax is somewhat like a dust which is coated on the entire surface of the mica particles.

Polymethylpentene is then thoroughly mixed with the mica, which has been coated with chlorinated paraffin wax, in a ribbon blender. There may be from 10% to 60% by volume of wax coated mica particles in the mixture, depending upon the application of polymethylpentene.

The resulting compound is then fed into a twin-screw extruder, such as one having gravometric feeders or loss and weight feeders, -the latter being those which sense the amount or weight of the product on a belt and vary the speed of the belt or auger accordingly. The compound is fed into three different ports simultaneously at three different points on the twin-screw extruder for more uniform heat distribution. The three feeders are slaved together.

Temperatures of the heat zones on the twin-screw extruder vary between about 325° and 475° F., -the die temperature being about 474° F. The vacuum pump is used to extract all volatiles in the material. The mixing in the extruder is intense but not so intense that it breaks mica particles or strips the paraffin coating from them. The paraffin coating serves as a binder for the finished product.

After the screw blending, the resulting material can be either under-water pelletized or strand cut.

The finished product is a homogeneous blend of polymethylpentene with mica that has been coated with chlorinated paraffin wax.

As a consequence of the present novel composition, the good electrical properties of polymethylpentene, such as its high dielectric properties are retained but the product is not distorted by heat at temperatures over 210° F., whereas in the past, appreciable distortion resulted from continued application of microwaves or heat at such temperatures.

The present product is highly useful in microwave ovens or in test ovens that are maintained at high temperatures for long periods of time.

Thus it will be seen that I have provided a new product of polymethylpentene including paraffin wax coated mica particles which highly improves its electrical as well as physical characteristics.

While I have described a single specific embodiment of my invention, it will be understood that this is by way of illustration only and that various changes and modifications may be contemplated in my invention and within the scope of the following claims.

I claim:

1. A composition of polymethylpentene including particles of mica coated with a binder and comprising about 10% to 60% by volume of binder-coated mica.

2. A product as recited in claim 1 wherein said binder is chlorinated paraffin wax and wherein said wax comprises, by volume, about 2% of the mica particles.

* * * * *